US010337505B2

(12) United States Patent
Lamb et al.

(10) Patent No.: US 10,337,505 B2
(45) Date of Patent: Jul. 2, 2019

(54) THERMAL ACTUATOR

(71) Applicant: Rostra Vernatherm, LLC, Bristol, CT (US)

(72) Inventors: Kevin W. Lamb, Naples, FL (US); Kenneth Lionello, Waterbury, CT (US); Alberto D. Medina Santamaria, Bristol, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 238 days.

(21) Appl. No.: 15/381,650

(22) Filed: Dec. 16, 2016

(65) Prior Publication Data
US 2018/0171989 A1    Jun. 21, 2018

(51) Int. Cl.
*F03G 7/06* (2006.01)
*F16J 1/02* (2006.01)
*F16J 9/12* (2006.01)
*G05D 23/02* (2006.01)

(52) U.S. Cl.
CPC .................. *F03G 7/06* (2013.01); *F16J 1/02* (2013.01); *F16J 9/12* (2013.01); *G05D 23/02* (2013.01)

(58) Field of Classification Search
CPC ........ F03G 7/06; G05D 23/02; G05D 23/021; F16J 15/16–3276; F16J 1/02; F16J 9/12
See application file for complete search history.

(56) References Cited

U.S. PATENT DOCUMENTS

| | | | | |
|---|---|---|---|---|
| 3,395,580 A | * | 8/1968 | Kuze ..................... | G05D 23/022 236/100 |
| 4,450,687 A | * | 5/1984 | Cole ..................... | G05D 23/021 236/101 R |
| 4,691,516 A | * | 9/1987 | Fornasari ........... | G05D 23/1921 60/527 |
| 5,509,269 A | * | 4/1996 | Kuze ..................... | G05D 23/02 60/527 |
| 6,772,958 B1 | | 8/2004 | Lamb et al. | |
| 6,988,364 B1 | | 1/2006 | Lamb et al. | |
| 7,469,841 B1 | | 12/2008 | Lamb et al. | |
| 7,617,700 B2 | | 11/2009 | Lamb et al. | |
| 8,490,885 B2 | | 7/2013 | Lamb et al. | |
| 9,133,952 B2 | | 9/2015 | Lamb et al. | |

(Continued)

FOREIGN PATENT DOCUMENTS

EP        1811277 A2 *  7/2007  ............. G05D 23/02

*Primary Examiner* — Mark A Laurenzi
*Assistant Examiner* — Xiaoting Hu
(74) *Attorney, Agent, or Firm* — Alix, Yale & Ristas, LLP

(57) ABSTRACT

A wax filled actuator includes a piston in direct contact with the thermally responsive wax material. A cup containing the wax is mechanically secured to a guide that receives and controls axial movement of the piston in response to expansion and contraction of the wax. A seal between the cup and guide prevents leakage of the wax. Another seal surrounds the piston and prevents leakage of the wax around the piston. In a disclosed embodiment, the piston has a cylindrical, polished outside surface that aids in preventing adhesion of the wax to the piston. In a disclosed embodiment, the seal surrounding the piston is a radially compressed annular elastomeric member. The seal surrounding the piston may be disposed between flat, annular wipers. The seal and wipers may be axially retained between the guide and a washer trapped between the cup and guide.

11 Claims, 1 Drawing Sheet

(56) References Cited

U.S. PATENT DOCUMENTS

| | | |
|---|---|---|
| 9,298,195 B2 | 3/2016 | Lamb et al. |
| 9,410,536 B2 | 8/2016 | Lamb et al. |
| 2005/0061893 A1* | 3/2005 | Inoue ................. G01K 5/44 236/100 |
| 2009/0107137 A1 | 4/2009 | Lionello et al. |
| 2010/0032594 A1 | 2/2010 | Lamb et al. |
| 2011/0186763 A1 | 8/2011 | Lamb et al. |
| 2012/0247582 A1* | 10/2012 | Lamb ................ F16K 11/044 137/468 |
| 2015/0316939 A1 | 11/2015 | Lamb et al. |
| 2016/0018831 A1 | 1/2016 | Lamb et al. |
| 2016/0069330 A1* | 3/2016 | McDonald .............. F03G 7/06 60/527 |

\* cited by examiner

THERMAL ACTUATOR

TECHNICAL FIELD

The present disclosure relates to actuators that utilize force generated by the expansion and contraction of wax due to temperature changes to generate movement used in temperature sensitive control mechanisms.

BACKGROUND

In a typical wax filled actuator, the wax is contained in rigid cup by an elastic diaphragm clamped at its periphery between the cup and a guide. The guide may include an elastic plug held tightly in position by the guide. A piston is received in the guide and is in contact with the plug. The temperature sensing wax material contained in the cup transfers pressure to the piston by means of the diaphragm and the plug. On cooling, the piston is returned to its original position by means of a return spring.

A variant of the diaphragm type actuator employs an incompressible fluid between the diaphragm and piston to transfer force from the wax to the piston. The incompressible fluid is contained by seals between the piston and the guide.

An alternative form of wax filled thermal actuator employs a synthetic rubber sleeve-like component shaped like the 'finger of a glove' which surrounds the piston. As the temperature increases, pressure from the expansion of the thermostatic material moves the piston with a lateral squeeze and a vertical push.

There is a need in the art for a compact and simplified thermal actuator that generates a pre-determined movement from a specified temperature change.

There is a need in the art for a compact and durable thermal actuator that will function over many thousands of cycles.

SUMMARY

A wax filled actuator includes a piston in direct contact with the thermally responsive wax material. A cup containing the wax is mechanically secured to a guide that receives and controls axial movement of the piston in response to expansion and contraction of the wax. A seal between the cup and guide prevents leakage of the wax. Another seal surrounds the piston and prevents leakage of the wax around the piston. This configuration dispenses with the diaphragm or boot used in the prior art to prevent wax leakage from the actuator reservoir. In a disclosed embodiment, the piston has a cylindrical, polished outside surface that aids in preventing adhesion of the wax to the piston. In a disclosed embodiment, the seal surrounding the piston is a radially compressed annular elastomeric member. The seal surrounding the piston may be disposed between flat, annular wipers. The seal and wipers may be axially retained between the guide and a washer trapped between the cup and guide.

DETAILED DESCRIPTION

Figure 1:
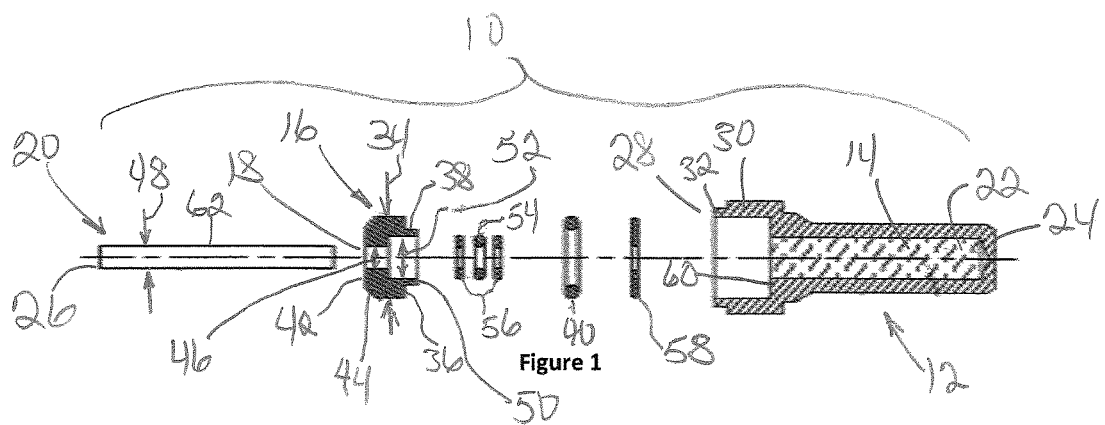
FIG. 1 is an exploded sectional view of a thermal actuator according to aspects of the disclosure.
Figure 2:
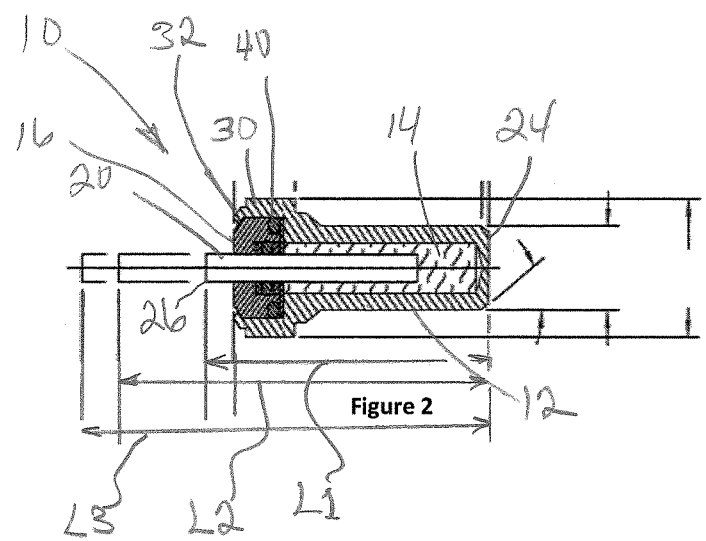
FIG. 2 is a sectional view of the thermal actuator of FIG. 1.

An embodiment of a thermal actuator according to aspects of the disclosure is shown in FIGS. 1 and 2 and designated by the reference numeral 10. The actuator 10 includes a cup 12 containing thermally responsive wax 14 and a guide 16 defining a stepped bore 18 for a piston 20. The cup 12 and guide 16 in the disclosed embodiment are constructed of 360 brass, but other materials may be compatible with the disclosed actuator. The cup 12 is filled with wax 14 selected to transition from solid to liquid in response to a predetermined increase in temperature from a first temperature T1 to a second temperature T2. The volume of the cavity 22 defined by the cup 12 can be varied to change the amount of wax 14 to match the force and stroke of the actuator 10 to specific uses. The stroke of the actuator is the change in distance that the piston 16 projects from the actuator 10 as the temperature increases above T1. The wax 14 expands during the transition from solid to liquid, generating pressure that pushes the piston 20 out of the guide 16 and away from the cup 12. The length of the actuator changes from a first length L1 at temperatures below T1 to a second, greater length L2 at temperatures at approximately T2. Above temperature T2, the disclosed actuator 10 may extend a further, predetermined amount to a third length L3. In one possible configuration, the change in length of the actuator can be used to move a valve member to change a fluid circulation path in response to a change in temperature. The assembled cup 12 and guide 16 may be used as a valve member.

In a disclosed embodiment: T1=194°-203° (90°+5°/−0° C.)
  L1=1.536 inch (39.02 mm)
  T2=212°-221° (100°+5°/−0° C.)
  L2=2.008 inch (51.02 mm)
  T3=329° F. (165° C.)
  L3—2.205 inch (56.02 mm)

In this embodiment, the maximum stroke of the actuator is 0.669 inch (17 mm), which is approximately 44% of the cold length L1 of the actuator 10, measured from a closed end 24 of the cup 12 to the outer end 26 of the piston 20 as shown in FIG. 2. The minimum stroke of the actuator 10 is 0.472 inch (12 mm), which is approximately 30% of the cold length L1 of the actuator 10.

The cup 12 has a closed end 24 and an open end 28. The open end 28 of the cup 12 is surrounded by an annular wall 30 that projects away from the closed end 24 of the cup 12 and terminates in a lip 32 having a radial thickness less than the wall 30. The guide 16 has an outside diameter 34 configured to be received within the wall 30. The outside surface of the guide 16 defines axial and radial surfaces 36, 38 that form part of a gland for an O-ring cup seal 40 between the cup 12 and guide 16. The outer end 42 of the guide 16 includes a beveled edge 44 that abuts the inside surface of the lip 32 in the assembled actuator 10 as shown in FIG. 2. The lip 32 is mechanically formed, or swaged, over the beveled edge 44 of the guide 16 to permanently secure the guide 16 to the cup 12 as shown in FIG. 2.

The guide 12 is configured to close the open end 28 of the cup 12 and control movement of the piston 20 during expansion and contraction of the wax 14. The first part 46 of the stepped bore 18 in the outer end 42 of the guide 16 is precisely machined to match the outside diameter 48 of the piston 20. The inner end 50 of the guide 16 defines the second part 52 of the stepped bore 18 that forms the outside diameter of a gland for an O-ring type piston seal 54 and a pair of disc-shaped wipers 56. A flat, machined washer 58 is trapped between the inner end 50 of the guide 16 and a shoulder 60 defined by the cup 12. The washer 58 is constructed of stainless steel and machined to a specified thickness with a tolerance of +/−0.002 inch. The annular outer portion of the washer 58 forms part of the gland for the O-ring cup seal 40 between the cup 12 and guide 16.

The annular inner portion of the washer 58 axially retains the wipers 56 and O-ring piston seal 54 in the positions shown in FIG. 2. One wiper 56 is positioned on either side of the O-ring piston seal 54. In the disclosed embodiment, the wipers 56 are constructed of polytetrafluoroethylene (PTFE) and have a thickness of 0.029 inch. The wipers have outside and inside diameters with a tolerance of +/−0.002 inch. The O-ring piston seal 54 surrounding the piston 20 is radially compressed between the piston 20 and the inside surface of the second part 52 of the stepped bore 18 defined by the guide 16, while the wipers 56 prevent the piston seal 54 from extruding along the piston 20. The piston seal 54 is selected with an outside diameter that is slightly larger than the inside diameter of the second part 52 of the stepped bore 18 defined by the guide 16. The piston seal 54 has a thickness that results in radial compression of the piston seal 54 when the piston 20 is inserted into the guide 16. The wipers 56 axially contain the piston seal 54 so that the radial compression of the piston seal 54 between the piston 20 and guide 16 results in a predictable forces between the inside diameter of the piston seal 54 and the outside surface 62 of the piston 20. The wipers 56 also prevent the O-ring piston seal 54 from rolling or rotating in place, which would permit wax 14 to be extruded from the cup 12. The O-ring piston seal 54 and cup seal 40 may be formed of Viton rubber or other durable, chemical resistant seal material. The cup seal 40 and piston seal 54 may be an elastomer material, or other suitably flexible and durable seal material. While radially compressed O-ring type seals are disclosed, other seal configurations may be compatible with the disclosed actuator.

The piston 20 is machined to very tight tolerances for diameter and run-out, meaning that the piston 20 has a very consistent cylindrical configuration. The diameter 48 of the piston 20 is controlled to a tolerance of +/−0.00025 inch. The piston 20 outside surface 62 is also given a very smooth, polished surface finish. Surface roughness is a component of surface texture. It is quantified by the deviations in the direction of the normal vector of a real surface from its ideal form. If these deviations are large, the surface is rough; if they are small, the surface is smooth. In the disclosed embodiment, the piston has a preferred roughness of 8 microinches (millionths of an inch), or at least less approximately 20 microinches. The smooth outside surface 62 of the piston 20 prevents adhesion of the wax 14 to the piston 20 and aids in containment of the wax 14 within the cup 12. The accurate cylindrical dimensions of the piston 20 result in a consistent radial compression of the piston seal 54 between the outside surface 62 of the piston 20 and the inside diameter of the second part 52 of the stepped bore 18 defined by the guide 16.

Hard or non-stick coatings may be suitable for application to the piston 20 outside surface 62. Coatings such as hard anodizing, diamond-like coating, PTFE, or non-stick coatings such as those used for cookware may help lower the friction of the piston movement through the guide, and aid in preventing adhesion of the wax to the piston. Alternatively, the piston surface may be passivated. Passivation involves creation of an outer layer of shield material that is applied as a microcoating, created by chemical reaction with the base material, or allowed to build from spontaneous oxidation in the air. As a technique, passivation is the use of a light coat of a protective material, such as metal oxide, to create a shell against corrosion The PTFE wipers 56 have a low coefficient of friction against the outside surface of the piston. Further, some of the PTFE material of the wipers will rub off on the piston 20 during use and serve to lubricate the piston/guide interface. The low friction properties and resulting dry lubrication of the piston/guide interface result in reliable axial movement of the piston 20 within the guide 16 over many thousands of extension/retraction cycles.

What is claimed:

1. A thermal actuator comprising:
   a cup defining a cavity and having a closed end and an open end surrounded by an axially projecting wall that terminates in an annular lip, said cup including a first radially inward projecting annular shoulder axially spaced from said open end;
   a guide defining a stepped bore having a first inside diameter at an outer guide end facing away from said cup and a second inside diameter at an inner guide end facing said cup, a junction of said first and second inside diameters defining a second radially inward projecting annular shoulder, said guide having an outside surface configured to be received within said wall, said inner guide end extending to a base;
   a piston received in said stepped bore, said piston having an outside diameter within 0.001 inch of said first inside diameter, said piston extending axially through said guide from a first end projecting axially away from said cup to a second end projecting into said cup;
   thermally expandable material in said cavity and in contact with a piston seal radially compressed between said piston outside diameter and said second inside diameter;
   a first annular wiper between said piston seal and said second radially inward projecting annular shoulder;
   an annular washer between the inner guide end and said first radially inward projecting annular shoulder, said annular washer abutting said base of said inner guide end and extending radially outwardly beyond said base of said inner guide end; and
   a second annular wiper between said piston seal and said annular washer,
   wherein said annular lip is formed over a peripheral edge of said outer guide end, with said washer trapped between said inner guide end and said first radially inward projecting annular shoulder, said first annular wiper, piston seal and second annular wiper axially contained between said second radially inward projecting annular shoulder and an annular portion of said washer radially inward of said first radially inward projecting annular shoulder.

2. The thermal actuator of claim 1, wherein said cavity is cylindrical and has a third inside diameter substantially the same as said stepped bore second inside diameter.

3. The thermal actuator of claim 2, wherein said piston outside diameter is at least 0.025 inches smaller than said third inside diameter.

4. The thermal actuator of claim 1, wherein said piston has a cylindrical, polished outside surface.

5. The thermal actuator of claim 4, wherein said piston outside surface has a surface roughness of less than 20 microinches.

6. The thermal actuator of claim 1, wherein said first and second annular wipers are flat annular discs defining a central opening with a diameter substantially equal to said piston outside diameter.

7. The thermal actuator of claim 1, wherein said cup and guide are formed of 360 brass.

8. The thermal actuator of claim 1, wherein said piston is formed of stainless steel and has a cylindrical, polished outside surface.

9. The thermal actuator of claim 1, wherein said inner guide end defines a peripheral groove containing an annular cup seal, said cup seal radially compressed between an outside diameter of said peripheral groove and an inside surface of said axially projecting wall, said cup seal axially positioned between a radially projecting surface of said peripheral groove and an annular portion of said washer radially outward of said cavity.

10. A thermal actuator comprising:
- a cup defining a cavity and having a closed end and an open end surrounded by an axially projecting wall having an inside surface and terminating in an annular lip, said cup including a first radially inward projecting annular shoulder axially spaced from said open end;
- a guide defining a stepped bore having a first inside diameter at an outer guide end facing away from said cup and a second inside diameter at an inner guide end facing said cup, a junction of said first and second inside diameters defining a second radially inward projecting annular shoulder, said guide having an outside surface configured to be received within said wall, said inner guide end defining a peripheral groove having an outside diameter and a radially projecting surface;
- an annular cup seal contained by said peripheral groove, said annular cup seal radially compressed between said outside diameter of said peripheral groove and said inside surface of said axially projecting wall;
- a piston received in said stepped bore, said piston having an outside diameter within 0.001 inch of said first inside diameter, said piston extending axially through said guide from a first end projecting axially away from said cup to a second end projecting into said cup;
- thermally expandable material in said cavity and in contact with a piston seal radially compressed between said piston outside diameter and said second inside diameter;
- a first annular wiper between said piston seal and said second radially inward projecting annular shoulder;
- an annular washer between the inner guide end and said first radially inward projecting annular shoulder, said annular washer having a first annular portion and a second annular portion; and
- a second annular wiper between said piston seal and said annular washer,
- wherein said annular lip is formed over a peripheral edge of said outer guide end, with said washer trapped between said inner guide end and said first radially inward projecting annular shoulder, said first annular wiper, piston seal and second annular wiper axially contained between said second radially inward projecting annular shoulder and said first annular portion of said washer radially inward of said first radially inward projecting annular shoulder, and said cup seal axially contained between said radially projecting surface of said groove and said second annular portion of said washer radially outward of said cavity.

11. The thermal actuator of claim 10, wherein said inner guide end extends to a base and said annular washer abuts said base and extends radially outwardly beyond said base.

* * * * *